(12) United States Patent
Niskanen et al.

(10) Patent No.: US 11,182,912 B2
(45) Date of Patent: Nov. 23, 2021

(54) IMAGE REGISTERING METHOD AND APPARATUS

(71) Applicant: VISIDON OY, Oulu (FI)

(72) Inventors: Matti Niskanen, Oulu (FI); Subingqian Hu, Oulu (FI)

(73) Assignee: VISIDON OY, Oulu (FI)

( * ) Notice: Subject to any disclaimer, the term of this patent is extended or adjusted under 35 U.S.C. 154(b) by 75 days.

(21) Appl. No.: 16/426,399

(22) Filed: May 30, 2019

(65) Prior Publication Data

US 2019/0378285 A1 Dec. 12, 2019

(30) Foreign Application Priority Data

Jun. 6, 2018 (GB) .................................... 1809244

(51) Int. Cl.
| | |
|---|---|
| *G06T 7/32* | (2017.01) |
| *G06T 7/37* | (2017.01) |
| *G06T 7/00* | (2017.01) |
| *G06T 5/20* | (2006.01) |
| *G06T 5/50* | (2006.01) |
| *G06T 5/10* | (2006.01) |

(52) U.S. Cl.
CPC .................. *G06T 7/32* (2017.01); *G06T 5/10* (2013.01); *G06T 5/20* (2013.01); *G06T 5/50* (2013.01); *G06T 7/37* (2017.01); *G06T 7/97* (2017.01); *G06T 2207/20021* (2013.01); *G06T 2207/20024* (2013.01); *G06T 2207/20056* (2013.01)

(58) Field of Classification Search
CPC .... G06T 7/32; G06T 7/37; G06T 7/97; G06T 5/20; G06T 5/50; G06T 5/10; G06T 2207/20021; G06T 2207/20056; G06T 2207/20024
See application file for complete search history.

(56) References Cited

U.S. PATENT DOCUMENTS

| 5,295,200 A | 3/1994 | Boyer | |
|---|---|---|---|
| 2004/0174437 A1* | 9/2004 | Dai ...................... | G06T 3/4084 348/222.1 |
| 2005/0018925 A1* | 1/2005 | Bhagavatula .......... | G06K 9/746 382/278 |
| 2006/0045313 A1 | 3/2006 | Gao et al. | |
| 2010/0150225 A1* | 6/2010 | Wredenhagen ...... | H04N 19/176 375/240.02 |
| 2015/0186753 A1* | 7/2015 | Horita .................. | G06K 9/4638 382/103 |

(Continued)

FOREIGN PATENT DOCUMENTS

| WO | 03/023718 | 3/2003 |
|---|---|---|
| WO | 2017/200395 | 11/2017 |

OTHER PUBLICATIONS

Combined Search and Examination Report for GB 1809244.5, dated Aug. 6, 2018, 6 pages.

(Continued)

*Primary Examiner* — Ruiping Li
(74) *Attorney, Agent, or Firm* — Nixon & Vanderhye P.C.

(57) ABSTRACT

A method of registering images by adjusting a distribution of spatial frequencies of correlation between spatial frequency functions of images, a number of images being N, where N being an integer equal to or larger than two, and determining at least one shift between the images using the frequency distribution adjusted correlation.

20 Claims, 3 Drawing Sheets

(56) References Cited

U.S. PATENT DOCUMENTS

2016/0292844 A1   10/2016  Karube
2017/0076447 A1    3/2017  Gruenwald et al.
2017/0180627 A1    6/2017  Paik et al.

OTHER PUBLICATIONS

Jang et al., "Sensor-Based Auto-Focusing System Using Multi-Scale Feature Extraction and Phase Correlation Matching", Sensors, 2015, vol. 15, pp. 5747-5762.

Hoge, "A Subspace Identification Extension to the Phase Correlation Method", IEEE Transactions on Medical Imaging, vol. 22, No. 2, Feb. 2003, pp. 277-280.

Tong et al., "A Novel Subpixel Phase Correlation Method Using Singular Value Decomposition and Unified Random Sample Consensus", IEEE Transactions on Geoscience and Remote Sensing, vol. 53, No. 8, Aug. 2015, pp. 4143-4156.

Response made to Report under Section 18(3) for GB1809244.5, dated May 16, 2019, 1 page.

Dana Dabiri, "Digital Particle Image Velocimetry—A Review," Department of Aeronautics and Astronautics, 1995, 54 pages.

\* cited by examiner

IMAGE REGISTERING METHOD AND APPARATUS

This application claims priority to GB Patent Application No. 1809244.5 filed 6 Jun. 2018, the entire contents of which is hereby incorporated by reference.

FIELD

The invention relates to a method of registering images and an apparatus for registering images.

BACKGROUND

To obtain disparity or translation transform between images of a same scene, an image registration is performed. However, noise such as low-light condition and blur significantly affects the image registration result. Though the images to be registered may be filtered with any of a plurality of existing denoise methods prior to the registration, the robustness and computational complexity leaves a lot to be desired. Hence, there is a need to improve the image processing related to the registration.

BRIEF DESCRIPTION

The present invention seeks to provide an improvement in the image processing related to the registration.

The invention is defined by the independent claims. Embodiments are defined in the dependent claims.

LIST OF DRAWINGS

Example embodiments of the present invention are described below, by way of example only, with reference to the accompanying drawings, in which FIG. 1 illustrates an example of two images with a shift;

DESCRIPTION OF EMBODIMENTS

Figure 1:
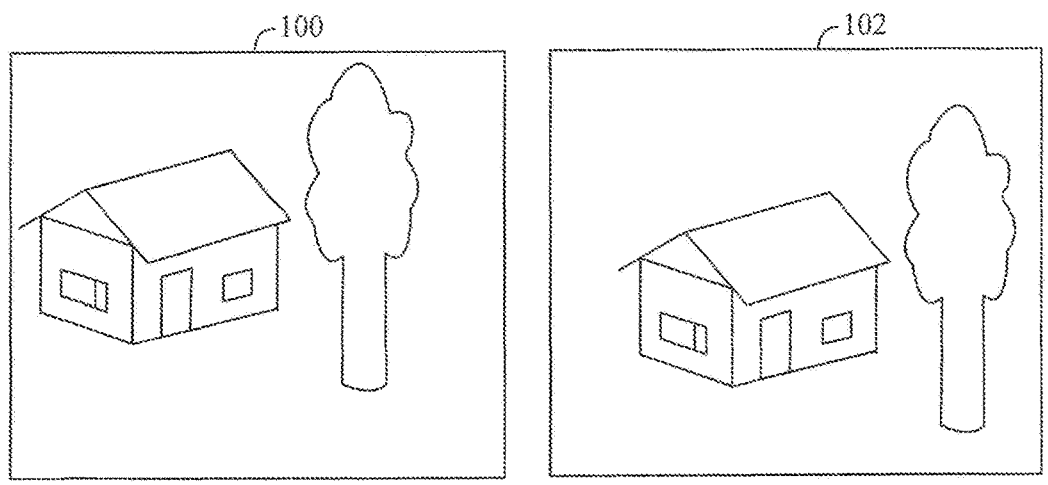

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned. All combinations of the embodiments are considered possible if their combination does not lead to structural or logical contradiction.

It should be noted that while Figures illustrate various embodiments, they are simplified diagrams that only show some structures and/or functional entities. The connections shown in the Figures may refer to logical or physical connections. It is apparent to a person skilled in the art that the described apparatus may also comprise other functions and structures than those described in Figures and text. It should be appreciated that details of some functions and structures are irrelevant to the actual invention. Therefore, they need not be discussed in more detail here.

In image registration, two or more images are processed in order to find a shift between the images on the basis of the same object(s)/feature(s) in the images. The shift, in turn, may be used align the images in a common coordinate system. The different images may then be fully or partly combined. The registration enables integration of image data of different images, if the images include the same feature(s). The feature(s) may refer to salient structure(s) such as forest(s), building(s), shadow(s), road(s), boundary(ies), corner(s), intersection(s) and top(s), for example.

The image registration is used in a plurality of fields, which include image processing. Examples of the fields of the image registration are pattern recognition, computer vision, machine vision, machine learning, and robot vision. The fields may also include automatic target recognition, microwave imaging, infrared imaging, visual imaging, ultraviolet imaging, roentgen imaging, tomographic imaging, ultrasound imaging, nuclear magnetic resonance imaging, microscopic imaging and imaging utilizing satellites, for example.

Image registration can generally be divided into two categories based on contents of the images used. One category is feature-based methods, where the registration is performed based on salient structures of the image, such as regions like forests, buildings and shadows; lines like roads and boundaries; and points like corners, intersections, and tops. The feature-based registration does not rely on the image intensities, thus making it ideal for matching images with varying illuminations. Similarly, the feature-based registration has good performance against noise as long as the noise is less dominant than the features used. This brings out the issue that it is very difficult if not impossible to find features that are stable and easy to detect at all times, while being discriminative, robust and invariant to all assumed differences between the images. Furthermore, the detection and matching of quality feature descriptors usually are very costly in term of computational demand, thus making the feature-based registration method incapable of real time application. Examples of feature-based algorithms are Harris detector, scale-invariant feature transform (SIFT) and speeded up robust features (SURF).

Another category is an area-based method, where the shift can be obtained directly through correlation between the intensities of the images. Furthermore, the correlation method can operate in either spatial or frequency domain. By performing the matching in frequency domain, the computational complexity can be reduced, especially when the images are large. The original correlation method can only register a shift/shifts between images. The original method can, however, be extended to scale and rotation with Fourier Mellin transform (log-polar transform). Most notable of area-based method is the phase correlation method.

The phase correlation by its definition is a cross-correlation with spectral whitening. Thus, it inhibits many positive characteristics, such as robustness against frequency dependent and correlated noise, as well as varying illumination. As a comparison to the original cross-correlation, the phase correlation generates very sharp peak corresponding a shift or displacement between images in its phase spectrum. However, it is also well known that the phase correlation is greatly affected by noise, and even more with a subpixel registration extension. Further problems may be caused by blur, such as out-of-focus and motion blur of the images, which eliminates high frequency details. The combination of blurs and noise is a major issue in modern image processing.

In the following text, a computationally effective method that improves the image registration under noisy environment is presented. The method can be utilized in a sub-pixel accuracy registration. The method does not compromise performance of the image registration at least noticeably under good conditions.

FIG. 1 illustrates examples of two images 100, 102. The images 100, 102 have a spatial shift therebetween. In general, the shift may be a translation, rotation and/or scaling (FIG. 1 shows only translation for simplicity). An image processing system (illustrated in FIG. 6) repeatedly receives or has available correlation data formed between spatial frequency spectrums 200 of two images 100, 102. In general, the correlation may also be formed between more than two images. The spatial frequency spectrum may also be called a spatial frequency function.

Figure 2:
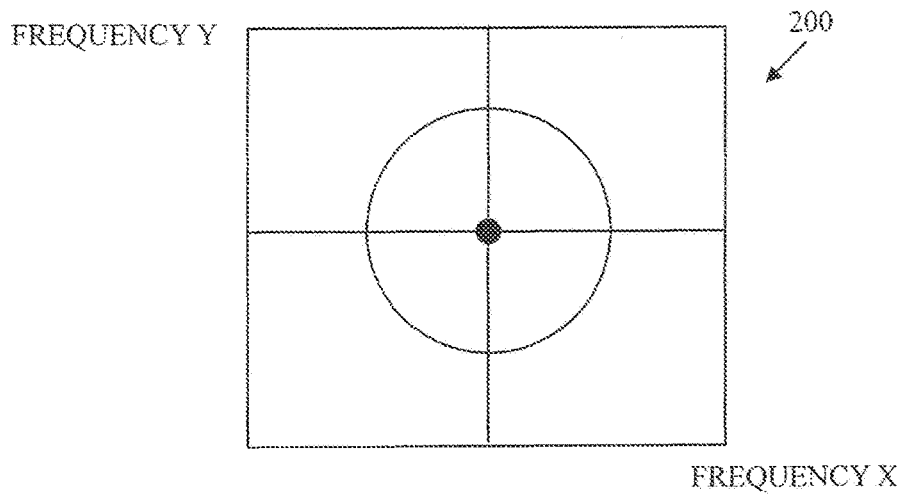
FIG. 2 illustrates an example of a spatial frequency spectrum of an image.

A two-dimensional example of spatial frequency function 200 is shown in FIG. 2. The axes (frequencies in two different orthogonal directions X, Y of the image) are in an arbitrary scale. In the middle, there are the direct current components i.e. 0 Hz and spatial frequencies close to it. Low frequency components are within the white circle, and the high frequency components are outside the white circle. If high frequencies are strong, it may be at least partly be caused by noise. The spatial frequency functions may be formed using a transform that transforms the spatial domain (usual image data) into a spatial frequency domain. One of said transforms is a Fourier-transform. The Fourier-transform may be performed as a fast Fourier-transform. It may also be possible to utilize some other integral transform instead of the Fourier-transform.

A correlation between the spatial frequency functions of the images 100, 102 may then be formed. The correlation may a phase correlation or a normalized correlation. Both of these may be considered as cross correlations.

Next, distribution of the spatial frequencies of the correlation between the spatial frequency functions of images 100, 102 is adjusted. The adjustment may refer to filtering.

In an embodiment, at least one shift between the images 100, 102 may be determined directly from the frequency distribution adjusted correlation. The determination of the at least one shift from the correlation, per se, is known in the prior art.

In a different embodiment from the direct determination, the frequency distribution adjusted correlation may be inverse transformed from a spatial frequency domain to a spatial domain for forming a spatial phase spectrum of the correlation. The inverse transform is inverse with respect to the transform which is used to transform the images 100, 102 in to the frequency domain.

Figure 3:
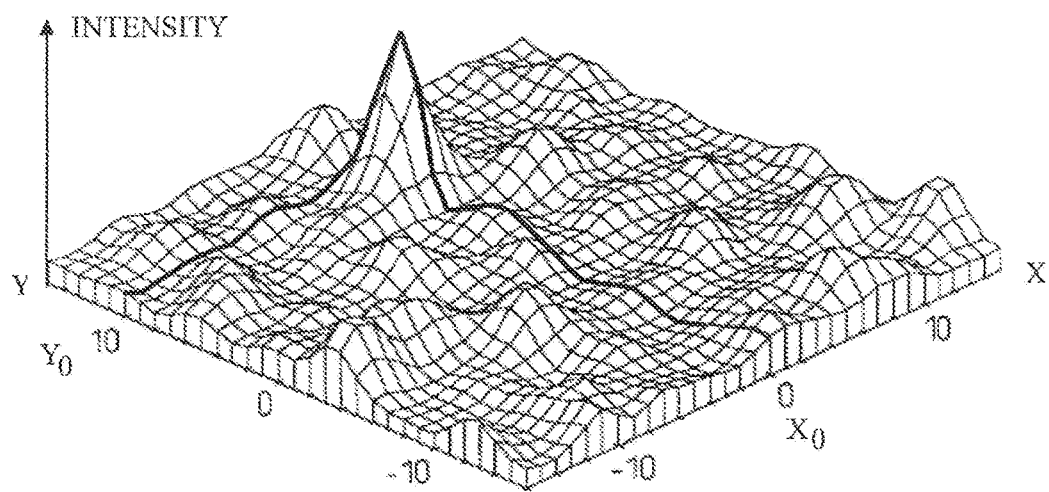
FIG. 3 illustrates an example of spatial phase spectrum of the correlation.

Cross-correlation is taught in a publication Cross-Correlation, Digital Particle Image Velocity—A Review by Dana Dabiri, Department of Aeronautics & Astronautics, Box 352400, University of Washington, Seattle, Wash., 98195, 1995. An example of the spatial phase spectrum 300 of the correlation is illustrated in FIG. 3 (slightly modified Figure of FIG. 12 of Dabiri's publication) where one correlation maximum of the correlation is illustrated at a location ($X_0$, $Y_0$), where X-axis refers to rows and Y-axis refers to columns of the pixels of the images in a common coordinate system. Thus, at least one spatial location ($X_0$, $Y_0$) having the correlation maximum of the spatial phase spectrum is determined in the method. A number of the at least one spatial location ($X_0$, $Y_0$) is in a range 1 to N−1, where a number of images is N and N is an integer larger than 1.

Finally, two or more of the images 100, 102 may be aligned and/or combined on the basis of the determined at least one shift. The aligning means that one image, some number of images between one image to N−1 images 100, 102, or N−1 images 100, 102 are moved with respect to each other by a distance determined by the shift in a direction determined also by the shift in the case of translation. A corresponding alignment may be done when it is question of rotation and/or scaling. The aligning, per se, is a prior art.

In an embodiment, two or more of the images 100, 102 are registered on the basis of the determined at least one spatial location ($X_0$, $Y_0$) which defines the shift.

The above mentioned qualities of the correlation, such as the phase correlation are based the idea that the algorithm focuses on the correlation of higher frequency contents in the images. The high frequency image contents, such as corners and lines are great features for image registration. Whereas the low frequency image contents include aliases and irrelevant weak features. However, the high frequency band is more sensitive to noise while low frequency is more resistant to the noise. Thus, the problem can be determined as selection problem that, in order to archive the ideal correlation, the noise affected high frequency contents should be ignored while preserving valid high frequency contents as much as possible, and including at the same time lower frequency contents for noise robustness. Additionally, it is desirable to keep a balance between the two without including too much aliases and contents that do not contribute to image registration.

The spatial phase spectrum has a certain frequency band i.e. the spatial phase spectrum is between a minimum frequency fmax and a maximum frequency fmin. In an embodiment, amplitudes of high frequencies in the upper half of the frequency band may be lowered. In an embodiment, amplitudes of low frequencies in the lower half of the frequency band may also be lowered. The lowering of the upper half and the lower half may be a frequency dependent function. The function may be linear or non-linear. Some amplitudes of the band may be set zero.

In an embodiment, the adjustment of the distribution of the spatial frequencies of the correlation may be performed on the basis of set imaging parameters of the images 100, 102. The set parameter may be brightness and/or contrast, for example. In an embodiment, the adjustment of the distribution of the spatial frequencies of the correlation may be performed on the basis of sensitivity of an imaging device capturing the images 100, 102. The sensitivity may be ISO (International Organization for Standardization) sensitivity, DIN (Deutsches Institut für Normung) or ASA (American Standard Association) sensitivity, for example. In an embodiment, the adjustment of the distribution of the spatial frequencies of the correlation may be performed on the basis of lighting conditions in conjunctions with the capture of the images 100, 102. The lighting conditions may be measured with a light meter which may be used to determine a proper exposure for the images.

Noise level can be also estimated by comparing the contents of the input images. The noise level may be estimated by performing a pixel-by-pixel comparison between aligned regions of two images taken from the same scene for example. Since a small misalignment combined with high frequency content may cause misinterpretations, some robust value, such as a median of differences may be used for the noise measurement. Increasing amount of blur also increases noise level in an image.

Figure 4:
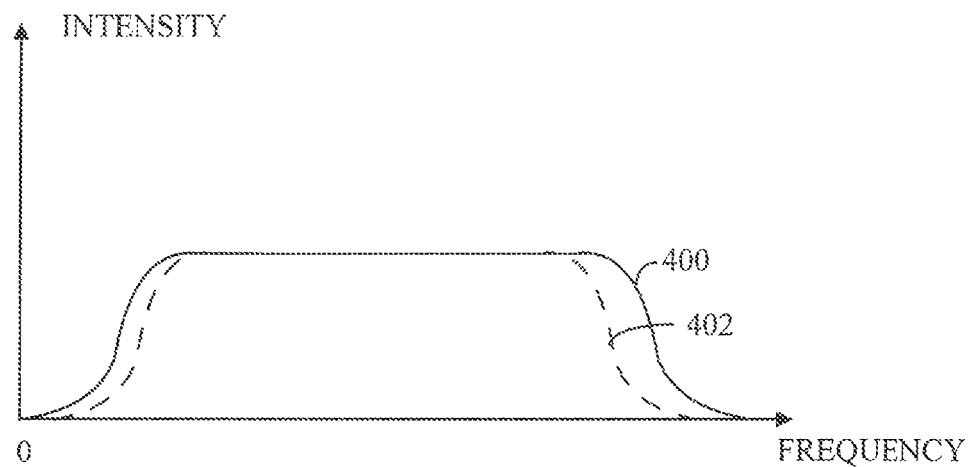
FIG. 4 illustrates an example of a spatial pass band of a filter performing a frequency distribution adjustment.

FIG. 4 illustrates examples of pass bands of a filter which performs the frequency distribution adjustment. The pass band may be wider if brightness is high. The pass band may be wider if the contrast is clear which means that a difference in intensity between an object and its environment is large. The pass band may be wider if the sensitivity is high. The pass band may be wider if the measured lighting condition refers to bright illumination, where the lighting condition is measured directly from the target by meter and not from the image. Also combination of these parameters may be used and their effect may be weighted in a desired manner in order to achieve a proper result. These parameters may be measured in numbers and if their values show that the image is not dark and thus suffering less from noise, high and low frequencies may be passed through and used in determination of the at least one shift between the images 100, 102 (see curve 400). An example of that is shown with a curve 400. If their values, in turn, show that the image is dark and/or blurred and thus suffering from noise, high frequencies may be reduced in filtering or used less in determination of the at least one shift between the images 100, 102. The high frequencies may be frequencies at and above a middle frequency of a band of the correlation. Alternatively, the high frequencies above an adaptive threshold may be blocked and not used if the image is determined dark, the adaptive threshold being determined on the basis of the at least one parameter. Low frequencies, which may be frequencies below a middle frequency of a band of the correlation, may remain unchanged in the filtering. An example of that is shown with a curve 402.

In an embodiment, at least one spatial location ($X_0$, $Y_0$) may be determined with a correlation maximum of the spatial phase spectrum of the correlation, a number of the at least one spatial location ($X_0$, $Y_0$) being at maximum N−1. The aligning operation of two or more of the images 100, 102 may be performed on the basis of the determined at least one spatial location ($X_0$, $Y_0$) because the determined at least one spatial location ($X_0$, $Y_0$) defines the shift.

In an embodiment, the images 100, 102 may be Fourier-transformed separately. Then the Fourier-transformed images 100, 102 may be correlated, and the frequency distribution adjusted correlation may be inverse Fourier-transformed for forming the spatial phase spectrum of the correlation.

In an embodiment, at least one spatial phase shift between the images 100, 102 may be determined on the basis of the at least one spatial location ($X_0$, $Y_0$) having a correlation maximum. Then the registration of the at least two of the images 100, 102 may be based on the at least one spatial phase shift therebetween.

In an embodiment, similarity of at least two of the images 100, 102 may be determined on the basis of a magnitude value of the maximum at the at least one spatial location related to said at least two of the images 100, 102.

In an embodiment, the at least two of the images 100, 102 may be determined registrable if said magnitude value associated with said at least two of the images 100, 102 is at or above a threshold. That the images 100, 102 are registrable may mean that the images represent the same feature, object or scene. The same feature, object or scene may be a fingerprint, for example.

In an embodiment, the at least two of the images 100, 102 may be determined unregistrable if the magnitude value associated with said at least two of the images 100, 102 is below the threshold. If the images are unregisterable, that may mean that the images do not represent the same feature, object or scene. Then the fingerprints in the images, for example, are not the same.

In an embodiment, the images 100, 102 may be transformed into the spatial frequency domain by performing at least one one-dimensional transform to each of the images 100, 102. In this manner, at least one row or one column of the pixel matrix may be transformed. By applying the one-dimensional transform to adjacent rows/columns, the whole image or a desired segment of the image may be transformed.

In an embodiment, the distribution of the spatial frequencies of the correlation between the spatial frequency functions may be performed by band-pass filtering. The band pass filtering reduces the high frequency noise, for example. The band pass filtering also limits effects of the low frequency band which, in turn, decreases problems related to aliasing and often irrelevant weak features.

In an embodiment, a boundary error of the transform of the images 100, 102 into the spatial frequency representations may be decreased by windowing. The widowing may be performed using a window function on the images 100, 102. The window function may a Blackman window, a Blackman-Harris window, a Bartlett window, a Hanning window, a Hamming window, a Tukey window and/or the like for example.

Figure 5:
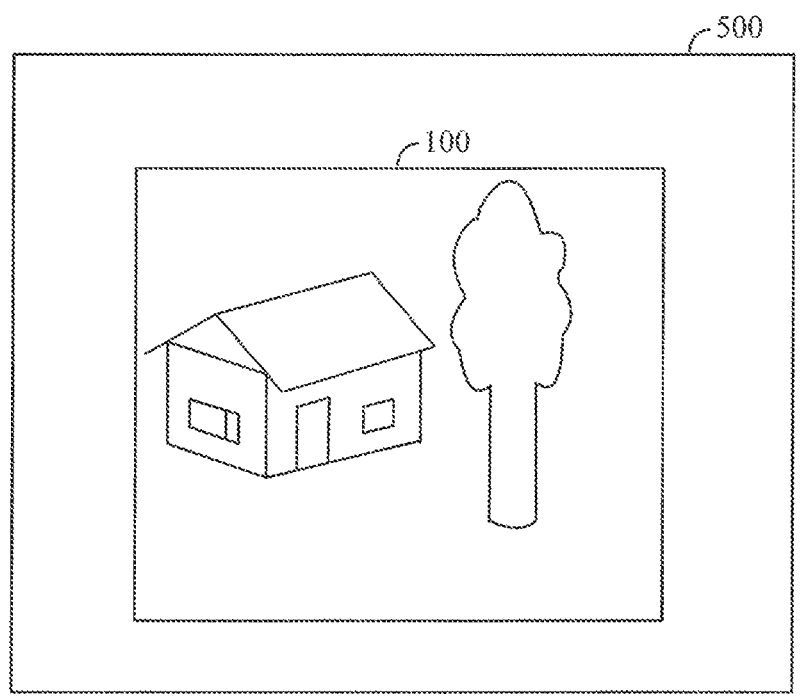
FIG. 5 illustrates an example where a section of a pre-image is an image to be registered.

In an embodiment an example of which is shown in FIG. 5, an image 100, 102 may be provided as a section from pre-image 500. All or a part of the images 100, 102 may be provided as sections from pre-images. Each of the images 100, 102 associated with the registration may have a smaller size than a pre-image 500 from which it is extracted.

In principle whole images 100, 102 may be registered. However, only selected sections of the images 100, 102 may be used in the registration in an embodiment while other parts may remain unused in the registration. The registration of the plurality of sections of the images 100, 102 may be weighted with the similarity of the images 100, 102. That is, the registration of each of the sections may be performed using the shift which has the highest magnitude value associated with the spatial phase shift between the images 100, 102 based on the correlation maximum. This utilizes the best estimate for the whole image.

In an embodiment, motion for whole image may be obtained by using weighted average of motions obtained for each section of the image. The weight per section may be obtained using magnitude of phase shift associated for section. That is, the registration may be performed using a common shift for all sections, the common shift being based on the shifts in the different sections. The weighting may be based on the similarity of the images 100, 102 i.e. the magnitude of the phase shift also in this case.

In an embodiment, each section may be registered with a corresponding section of the at least one image 100, 102 on the basis of the magnitude value associated with the spatial phase shift between the sections separately.

In an embodiment, a sub-pixel registration of the two or more of the images 100, 102 may be performed. The sub-pixel registration may be performed using Gaussian function fitting which refers to interpolation based on an assumption that the images follow a Gaussian distribution. The sub-pixel registration may also be based on a sinc or esinc function. In a similar manner, a Foroosh subpixel method, a quadratic function fitting, a Ren-method or the like may be used. The sub-pixel registration is possible when the adjustment of distribution of spatial frequencies of the correlation is designed to support sub pixel registration which is fulfilled if the spatial frequencies of the correlation are not limited to pixel size.

The sub-pixel registration defines the at least one shift between the images 100, 102 more accurately than a pixel of the images 100, 102. In an embodiment, the sub-pixel registration may be based on interpolation. The interpolations may refer to a correlation interpolation, an intensity interpolation or a differential method, the sub-pixel registrations, per se, being known in the prior art. The interpolation may be performed after the inverse Fourier-transform of the correlation. In an embodiment, the sub-pixel registration may be based on a least squares adjustment to a two-dimensional plane of the images 100, 102, the least squares adjustment, per se, being known in the prior art. In an embodiment, the sub-pixel registration may be based on a singular value decomposition (SVD) which, per se, in known in the prior art. In an embodiment, the sub-pixel registration may be based on the SVD and a random sample consensus (RANSAC) algorithm, the RANSAC algorithm, per se, being known in the prior art. Algorithms, which are able to register images with subpixel accuracy, are, and phase correlation. It may be possible to achieve an accuracy that is one hundredth of a size of a pixel although any value below one may be good enough.

Figure 6:
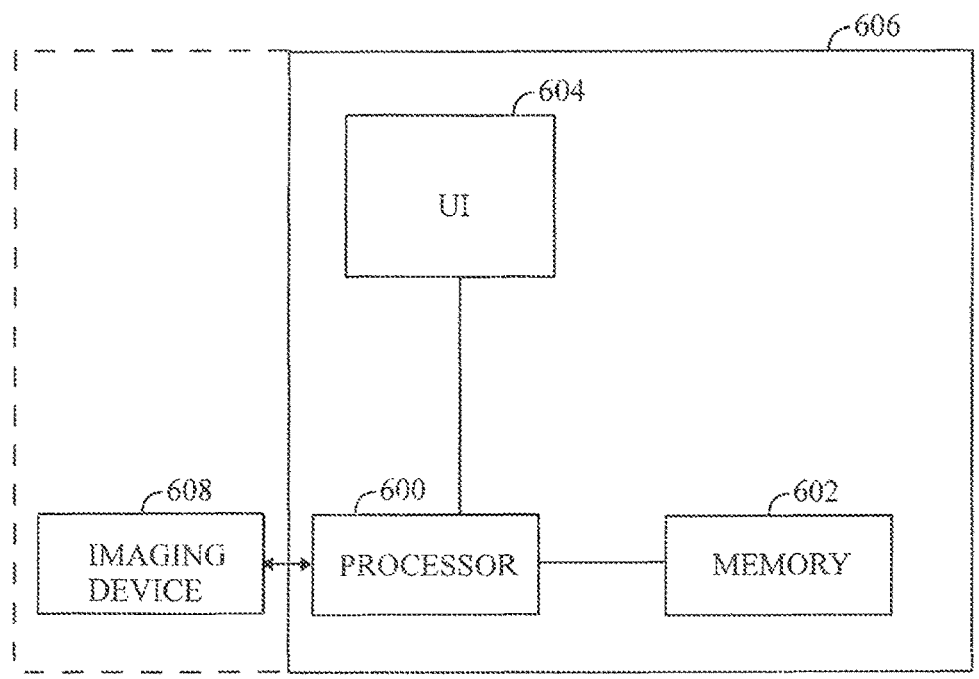
FIG. 6 illustrates an example of an image processing system 506.

FIG. 6 illustrates an example of an image processing system 606, which performs the method steps. The image processing system 606 may comprise one or more processors 600 and one or more memories 602 including computer program code. The one or more processors 600, the one or more memories 602 and the computer program code cause the apparatus at least to perform the method steps. The image processing system 606 may comprise also a user interface 604 which may comprise a screen and a keyboard or a touch screen, for example. Additionally, the image processing system 606 may comprise an imaging device 608. The imaging device 608 may be a camera or the like, which captures or forms an image of a target.

A computer program product, which is readable by a computer, may comprise program instructions which, when executed by the computer, result in execution of a computer process comprising at least one of the steps of the method.

The novel frequency domain filter has been designed to be applied with correlation spectrum between the matching images to address the above selection problem. By directly designing and applying a frequency filtering adjustment to correlation spectrum, the computation can be limited to a single step of a two-dimensional element-wise multiplication process. Thus, the method has a low computation requirement compared with the traditional pre-denoise methods that need to be applied to both/all input images. Additionally, the modularity of the method has a benefit of compatibility with existing implementations. Furthermore, the filter may purposefully be designed with Gaussian function in order to match the Gaussian function fitting subpixel registration method, which is currently one of the most robust and computationally efficient subpixel registration methods. This is based on the research that masking shape of the correlation spectrum can further improve the accuracy and robustness of the Gaussian function fitting subpixel registration. Still, the proposed method can be easily redesigned for other cross-correlation based subpixel registration methods. Notably the method is compatible also with Hoge et al. method to directly determine the subpixel displacement in correlation spectrum.

Figure 7:
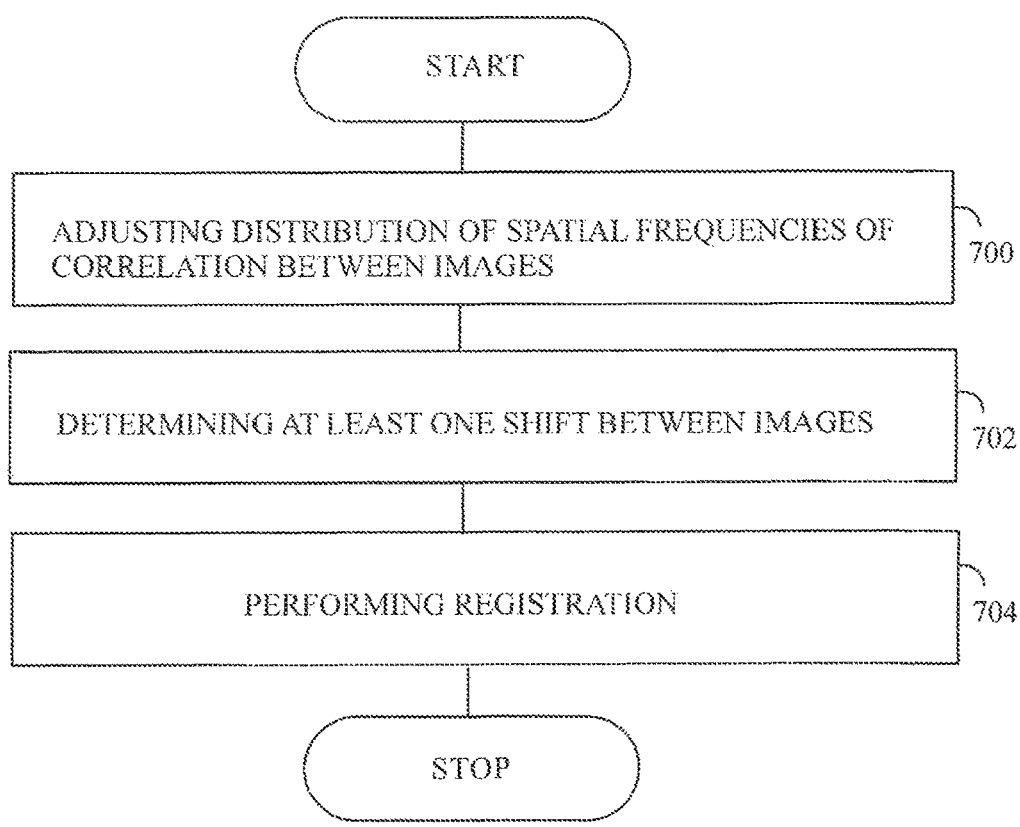
FIG. 7 illustrates of an example of a flow chart of a registration method.

FIG. 7 is a flow chart of the measurement method. In step 700, a distribution of spatial frequencies of correlation between spatial frequency functions 200 of images 100, 102 is adjusted, a number of images being N, where N being an integer equal to or larger than two. In step 702, at least one shift between the images 100, 102 is determined on the basis of the frequency distribution adjusted correlation. In step 704, an alignment operation of two or more of the images 100, 102 may be performed on the basis of the determined at least one shift.

The method shown in FIG. 7 may be implemented using an electric circuit and a computer program. The electric circuit may comprise a sequential synchronous state machine, which consumes time and energy in processing the input distribution of spatial frequencies of the correlation in order to register the images in a specific manner. The computer program may be placed on a computer program distribution means for the distribution thereof. The computer program distribution means is readable by the image processing system 606.

The computer program may be distributed using a distribution medium which may be any medium readable by the controller. The medium may be a program storage medium, a memory, a software distribution package, or a compressed software package. In some cases, the distribution may be performed using at least one of the following: a near field communication signal, a short distance signal, and a telecommunications signal.

It will be obvious to a person skilled in the art that, as technology advances, the inventive concept can be implemented in various ways. The invention and its embodiments are not limited to the example embodiments described above but may vary within the scope of the claims.

What is claimed is:

1. A method of registering images, the method comprising:
   estimating noise level of the images by comparing contents of the images;
   adjusting a distribution of spatial frequencies of correlation between spatial frequency functions of images based on a selection from the group comprising the estimated noise level of the images, set imaging parameters of the images, sensitivity of an imaging device capturing the images, and lighting conditions in conjunction with captures of the images, a number of images being N, where N being an integer equal to or larger than two, wherein at least the estimated noise level of the images is selected; and
   determining at least one shift between the images using the frequency distribution adjusted correlation.

2. The method of claim 1, further comprising determining at least one spatial phase shift between the images based on at least one spatial location associated with a correlation maximum.

3. The method of claim 1, further comprising inverse transforming the frequency distribution adjusted correlation from a spatial frequency domain to a spatial domain for forming a spatial phase spectrum of the correlation and for determining the at least one shift from the spatial phase spectrum.

4. The method of claim 2, further comprising Fourier-transforming the images separately, correlating the Fourier-transformed images, and inverse Fourier-transforming the frequency distribution adjusted correlation for forming the spatial phase spectrum.

5. The method of claim 1, further comprising determining the at least one shift directly from the correlation between the spatial frequency functions of images.

6. The method of claim 2, further comprising determining similarity of at least two of the images based on a magnitude value of the maximum at the at least one spatial location related to said at least two of the images.

7. The method of claim 6, further comprising determining the at least two of the images registrable if said magnitude value associated with said at least two of the images is at or above a threshold, and determining the at least two of the images unregistrable if the magnitude value associated with said at least two of the images is below the threshold.

8. The method of claim 1, further comprising transforming the images into the spatial frequency domain by performing at least one one-dimensional transform to each of the images.

9. The method of claim 1, further comprising adjusting the distribution of the spatial frequencies of the correlation between the spatial frequency functions by band-pass filtering.

10. The method of claim 1, further comprising decreasing a boundary error of a transform of the images into the spatial frequency functions by windowing.

11. The method of claim 2, further comprising providing the images as sections from pre-images, each of the images associated with the registration having a smaller size than a pre-image from which it is extracted.

12. The method of claim 11, further comprising registering only the sections of the images, and weighting the registration with the similarity of the images.

13. The method of claim 1, further comprising correlating the spatial frequency functions using phase correlation or normalized correlation.

14. The method of claim 1, further comprising performing a sub-pixel registration of the two or more of the images.

15. An apparatus for registering images, wherein the apparatus comprises an image processing electric circuit system configured to:
   estimate noise level of the images by comparing contents of the images;
   adjust a distribution of spatial frequencies of correlation between spatial frequency functions of images, based on a selection from the group comprising the estimated noise level of the images, set imaging parameters of the images, sensitivity of an imaging device capturing the images, and lighting conditions in conjunction with captures of the images, and a number of images being N, where N being an integer equal to or larger than two, wherein at least the estimated noise level of the images is selected; and
   determine at least one shift between the images using the frequency distribution adjusted correlation.

16. The apparatus of claim 15, wherein the image processing system comprises:
   one or more processors; and
   one or more memories including computer program code;
   the one or more processors, the one or more memories and the computer program code being configured to cooperate to cause the apparatus at least to perform the adjustment of the distribution of the spatial frequencies and the determination of the at least one shift between the images.

17. A non-transitory computer program product comprising program instructions for registering images which, when executed by a computer, cause the computer to perform operations comprising:
   estimating noise level of the images by comparing contents of the images;
   adjusting a distribution of spatial frequencies of correlation between spatial frequency functions of images based on a selection from the group comprising the estimated noise level of the images, set imaging parameters of the images, sensitivity of an imaging device capturing the images, and lighting conditions in conjunction with captures of the images, a number of images being N, where N being an integer equal to or larger than two, wherein at least the estimated noise level of the images is selected; and
   determining at least one shift between the images using the frequency distribution adjusted correlation.

18. The method of claim 1, wherein the estimating of the noise level comprises performing a pixel-by-pixel comparison between aligned regions of two images taken from a common scene.

19. The method of claim 18, further comprising using a median of differences in the estimating of the noise level provided that there is a misalignment below a predetermined threshold coupled with high-frequency content.

20. The non-transitory computer program product of claim 17, wherein the estimating of the noise level comprises performing a pixel-by-pixel comparison between aligned regions of two images, and
   wherein a median of differences is used in the estimating of the noise level provided that there is a misalignment below a predetermined threshold coupled with high-frequency content.

* * * * *